United States Patent [19]

Glennon et al.

[11] Patent Number: 4,933,801

[45] Date of Patent: Jun. 12, 1990

[54] GROUND FAULT CIRCUIT INTERRUPTER

[75] Inventors: Oliver Glennon; Liam Kenny, both of Ballinasloe, Ireland

[73] Assignee: Square D Company, Palatine, Ill.

[21] Appl. No.: 340,342

[22] Filed: Apr. 19, 1989

[51] Int. Cl.⁵ .............................................. H02H 3/26
[52] U.S. Cl. ........................................ 361/45; 361/46
[58] Field of Search ................... 361/45, 46, 42, 49, 361/102; 340/649–652, 661

[56] References Cited

U.S. PATENT DOCUMENTS

| 4,068,276 | 1/1978 | Pintell | 361/46 |
| 4,598,331 | 7/1986 | Legatti | 361/46 |
| 4,736,265 | 4/1988 | Gyongyosi et al. | 361/45 |

FOREIGN PATENT DOCUMENTS

| 0154450 | 4/1985 | European Pat. Off. |
| 2000398 | 1/1979 | United Kingdom |
| 2162708 | 2/1986 | United Kingdom |

Primary Examiner—Todd E. Deboer
Attorney, Agent, or Firm—Jose W. Jimenez

[57] ABSTRACT

A ground fault circuit interrupter which continues to provide ground fault protection in the event of loss of neutral includes a blocking means formed by a pair of back-to-back Zener diodes which complete an energizing path for a circuit breaker on loss of neutral. The circuit interrupter also includes a standby rectifier circuit formed by a pair of diodes which complete a full wave rectifier having line and earth inputs in the event of loss of neutral.

6 Claims, 1 Drawing Sheet

GROUND FAULT CIRCUIT INTERRUPTER

FIELD OF THE INVENTION

The present invention relates to a ground fault circuit interrupter.

BACKGROUND OF THE INVENTION

Existing ground fault circuit interrupters are generally quite effective at opening a line or power lead in response to a ground fault (sometimes referred to as an earth leakage). Many such circuit interrupters operate on the principle of detecting a current imbalance between line and neutral leads. This imbalance causes a current to flow in a secondary winding of a differential transformer. When the secondary winding conducts a tripping circuit activates a circuit breaker which opens the line lead.

One problem with such circuit interrupters is that, generally, the circuit breaker cannot be energised if the neutral lead is open. This can occur if a neutral conductor is loosened due to vibration or if a screw or wire clamp has not been tightened properly on installation. Alternatively, the neutral lead may be opened upstream of the circuit interrupter. The absence of ground fault protection in these circumstances may be hazardous.

In an effort to overcome this problem, ground fault circuit interrupters have been devised which include circuits for detection of opening of the neutral lead. Examples of such circuit interrupters are described in U.S. Pat. No. 4,598,331 (Legatti) and European Patent Specification No. 154,450 (Delta). These circuit interrupters operate on the principle of opening the line or power lead immediately on detection of an open neutral lead. In the case of Legatti, a supplemental winding connected between the neutral and earth leads conducts in the event of loss of neutral, thus activating a tripping circuit for a circuit breaker. In the Delta circuit interrupter, the neutral and earth leads are interconnected by a Zener diode selected to break down when the voltage between these leads exceeds a certain level, this being indicative of loss of neutral. When this happens, a circuit breaker is tripped.

While these circuit interrupters appear to be satisfactory when it is desired to disconnect equipment on loss of neutral, they are not suitable when continuity of operation is important and it is only necessary to ensure continued protection in the event of a ground fault whether o not the neutral is open.

United Kingdom Pat. No. 2,000,398 describes a ground fault circuit interrupter which provides continuing protection in the event of loss of neutral. This is achieved by connecting a power supply in the circuit interrupter to earth, in addition to the line and neutral connections, so that on loss of neutral the earth lead takes over the function of the neutral lead. In this arrangement, however, it is anticipated that there would be a leakage current in the earth connection. If there are a number of such circuit interrupters connected in the same circuit, these earth leakage currents may together be sufficient to cause tripping of other ground fault circuit interrupters.

SUMMARY OF THE INVENTION

According to the invention, there is provided a ground fault circuit interrupter for use in a system having line, neutral, and ground leads, the circuit interrupter also having a ground fault detection circuit and associated tripping circuit, a circuit breaker operated by the ground fault tripping circuit, and an energizing circuit for the circuit breaker comprising blocking means to allow circuit breaker energizing current to flow to earth only if the neutral lead is open.

In a preferred embodiment of the invention the ground fault circuit interrupter further comprises a rectifier for DC output. In this arrangement the circuit interrupter preferably includes a standby rectifier circuit connected to the rectifier and arranged to complete a standby rectifier having an input connected to the line and earth leads if the neutral lead is open.

OBJECTS OF THE INVENTION

The present invention is directed towards providing a ground fault circuit interrupter which provides ground fault protection when there is loss of neutral, without allowing earth leakage currents to develop.

Another object of the invention is to provide continued full wave AC to DC rectification in a circuit interrupter in the event of loss of neutral.

These and other features, advantages and objects of the invention will be more clearly understood from the following description of an embodiment thereof given by way of example only with reference to the accompanying drawing.

DETAILED DESCRIPTION OF THE PREFERRED EMBODIMENT

Figure 1:
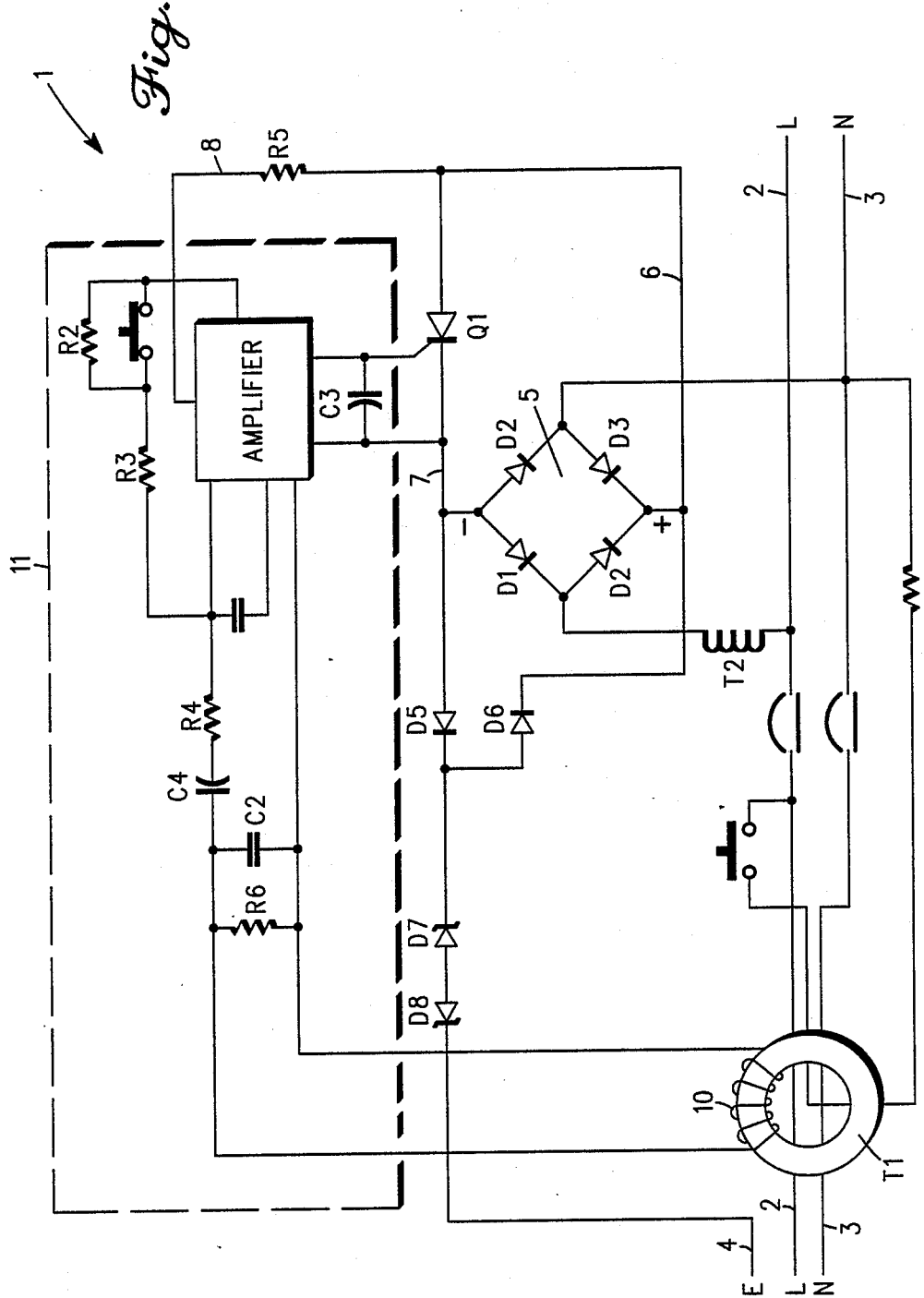
FIG. 1 is a circuit diagram of a circuit interrupter according to the invention.

Referring to the drawing there is illustrated a ground fault circuit interrupter according to the invention, indicated generally by the reference numeral 1. The circuit interrupter 1 includes a line lead 2, a neutral lead 3 and an earth lead 4. A full wave bridge rectifier 5 comprising diodes D1 to D4 has an input connected between the line lead 2 and the neutral lead 3 and includes a positive output lead 6 and a negative output lead 7 for connection to a load, (not shown).

The circuit interrupter 1 further comprises a ground fault detection circuit which consists of a differential transformer T1 in which the line and neutral leads 2 and 3 act as opposed primary windings. A secondary winding 10 of the differential transformer T1 is connected to a tripping circuit 11 (indicated by interrupted lines). The tripping circuit 11 is conventional and briefly comprises a resistor R6 connected in parallel with the secondary winding 10 and across the input of an amplifier U1. Power for the amplifier U1 is transmitted through a lead 8 having a resistor R5 connected to the positive lead 6 of the bridge rectifier 5.

A solenoid T2 connected between the line lead 2 and the bridge rectifier 5 and an SCR Q1 connected across the output of the bridge rectifier 5 form a circuit breaker which is arranged to open both the line and neutral leads 3 and 2, respectively. The gate of the SCR Q1 is connected to the amplifier U1. An energizing circuit is completed either to earth or to the neutral lead, depending on whether or not the neutral lead is open. The conventional energizing circuit, under normal conditions when the neutral lead is not broken is through the solenoid T2, the diode D4, the bridge rectifier positive lead 6, the SCR Q1, and the diode D2 to the neutral lead 3. The energizing circuit, however, further comprises blocking means formed by a pair of Zener diodes D7 and D8 arranged back-to-back and connected between the negative lead 7 of the bridge rectifier 5 and the earth lead 4. The Zener diodes D7 and D8 are in series with their anodes interconnected. Operation of the circuit breaker under open neutral conditions is described below.

The circuit interrupter 1 also comprises a standby rectifier circuit formed by diodes D5 and D6. The anode of the diode D5 is connected to the negative lead 7 and the cathode is connected to both the cathode of the Zener diode D7 and to the anode of the diode D6. The cathode of the diode D6 is in turn connected to the positive lead 6 of the bridge rectifier 5.

In operation, if a ground fault occurs when the neutral lead is not broken, a voltage will appear across the resistor R6 of the ground fault tripping circuit 11 and the output of the amplifier U1 will go high and operate the SCR Q1. When this occurs, the output of the bridge rectifier 5 is effectively shorted through the SCR Q1 and an energizing circuit for the SCR will be completed through the diode D2 of the bridge rectifier 5 to the neutral lead 3 so that the solenoid T2 is activated to open the line and neutral leads.

If a ground fault occurs when the neutral lead 3 is open, the diodes D2 and D3 of the bridge rectifier 5 are disconnected. The bridge rectifier is, however, completed by the diodes D1 and D4 and the standby rectifier diodes D5 and D6 which form a new full wave rectifier having line and earth inputs. As the neutral lead is open, the energizing circuit for the SCR Q1 and the solenoid T2 is completed through the Zener diodes D7 and D8 (which have appropriate breakdown values) to earth.

It has been found that the Zener diodes D7 and D8 prevent earth leakage currents under normal operation. For any one circuit interrupter, such leakage currents would be quite low, of the order of tens of milliamps. However, a number of such circuit interrupters connected in the same circuit may cause an earth leakage fault to be detected elsewhere if the Zener diodes D7 and D8 were not present.

It will be appreciated that the circuit interrupter of the invention provides for continued ground fault protection in the event of loss of neutral in a simple and cost-effective manner, as it requires only four diodes in addition to a conventional ground fault circuit interrupter. These additional diodes allow continued full wave rectification on loss of neutral, thus preventing damage to circuits or devices supplied by the circuit interrupter, while at the same time preventing the occurrence of small earth leakage currents.

Various changes, modifications and variations may be made to the arrangement described without departing from the scope of the invention.

It is envisaged that the standby rectifier may comprise a single diode, for example diode D5, if half-wave rectification only is required on loss of neutral. In this case two blocking diodes would not be necessary and in this example, Zener diode D7 alone would suffice.

What is claimed is:

1. A ground fault circuit interrupter for use in a system having line, neutral and earth leads between an energy source and a load, said circuit interrupter comprising:
   a ground fault detection circuit;
   a ground fault tripping circuit associated with said ground fault detection circuit;
   a circuit breaker operated by said ground fault tripping circuit;
   an energizing circuit for said circuit breaker comprising a full wave bridge rectifier having an input connected to the line and neutral leads and having positive and negative output terminals;
   a standby rectifier circuit, having an input connected to the line and earth leads, including a first diode and a second diode, the anode of the first diode being connected to the negative terminal of said full wave rectifier, and the cathode being connected to the anode of the second diode, the cathode of which is connected to the positive terminal of said full wave rectifier; and
   blocking means connected to the cathode of said first diode to allow circuit breaker energizing current to flow to earth only if the neutral lead is open.

2. The ground fault circuit interrupter as recited in claim 1 in which said blocking means comprises a Zener diode connected between said earth lead and said circuit breaker.

3. The ground fault circuit interrupter as recited in claim 1 wherein said blocking means comprise a pair of back-to-back Zener diodes connected in series between said circuit breaker and the earth lead.

4. The ground fault circuit interrupter as recited in claim 1 wherein said circuit breaker comprises a solenoid connected in series with a silicon controlled rectifier.

5. The ground fault circuit interrupter as recited in claim 4 wherein the solenoid is connected between the line lead and said full wave rectifier, and the silicon controlled rectifier is connected across the output of said full wave rectifier.

6. The ground fault circuit interrupter as recited in claim 1 wherein said ground fault detection circuit comprises a differential transformer having a pair of opposed primary windings and a secondary winding connected to a tripping circuit for operating said circuit breaker on detection of current flow in the secondary winding.

* * * * *